United States Patent

Manoogian

[11] Patent Number: 5,917,442
[45] Date of Patent: Jun. 29, 1999

[54] MISSILE GUIDANCE SYSTEM

[75] Inventor: David V. Manoogian, Lynnfield, Mass.

[73] Assignee: Raytheon Company, Lexington, Mass.

[21] Appl. No.: 09/010,695

[22] Filed: Jan. 22, 1998

[51] Int. Cl.$^6$ .............................. G01S 13/72; G01S 13/87; G01S 13/88; F41G 7/22

[52] U.S. Cl. ............................... 342/62; 342/75; 342/97; 244/3.14; 244/3.19

[58] Field of Search ................................... 342/62, 75, 76, 342/78, 81, 96, 97; 244/3.13, 3.14, 3.15, 3.16, 3.19

[56] References Cited

U.S. PATENT DOCUMENTS

| | | | |
|---|---|---|---|
| 3,711,046 | 1/1973 | Barhydt et al. | 244/3.12 |
| 3,883,091 | 5/1975 | Shaefer | 244/3.13 |
| 3,883,961 | 5/1975 | Limouze | 434/12 |
| 3,951,358 | 4/1976 | DeLano et al. | 244/3.15 |
| 4,470,562 | 9/1984 | Hall et al. | 244/3.2 |
| 5,082,201 | 1/1992 | Le Bars et al. | 244/3.16 |
| 5,440,314 | 8/1995 | Tabourier | 342/371 |
| 5,452,864 | 9/1995 | Alford et al. | 244/3.23 |

*Primary Examiner*—John B. Sotomayor
*Attorney, Agent, or Firm*—Fish & Richardson P.C.

[57] ABSTRACT

A method for guiding a missile to a target. The method includes the step of providing a surface-based radar system having an electronically beam steerable antenna system adapted for continuous mechanical rotation about an axis. During a pre-terminal, semi-active missile homing guidance phase, the beam produced by the antenna system is electronically rotated by the antenna system in a direction counter to the direction of the mechanical rotation of the antenna system to thereby increase radar system illumination time on the target. Further, during the increased illumination time, the beamwidth of the surface-based radar system beam is increased. During, a subsequent terminal, active homing missile guidance phase, guiding the missile to the target with the pre-terminal, semi-active missile homing guidance phase using the surface-based radar system and establishing an angular orientation for a missile-borne antenna system at the commencement of the terminal, active missile homing guidance system phase.

17 Claims, 6 Drawing Sheets

MISSILE GUIDANCE SYSTEM

BACKGROUND OF THE INVENTION

This invention relates generally to missile guidance systems and more particularly to radar guided missile systems.

As is known in the art, a missile may be guided to a target by guidance signals developed from tracking data obtained either at a surface-based radar station or by radar means located totally, or partially, within the missile. The former system is commonly referred to as a command guidance system and the latter as a missile homing guidance system. For example, in a command guidance system where a missile is used to intercept an airborne target, a large, remotely located, high resolution surface-based radar system and high speed digital computer are provided for selecting one of a plurality of targets, tracking both the missile and the selected target, calculating proper guidance signals for the missile from the generated tracking data, and transmitting such signals to the missile to enable the missile to intercept the target. As is known, a reference element, such as an attitude stabilized platform is generally required to be contained within the missile for transformation of the transmitted signals into missile control signals.

In a missile homing guidance system, a smaller, light weight, lower power target tracking radar system may be provided for generation of both target tracking data and guidance signals. In one type of missile homing guidance system, both the radar transmitter and receiver are located in the missile and in another type of homing system the radar transmitter is located remotely from the missile while the receiver is located in the missile. The former missile homing system is referred to as an active guidance system and the latter as a semi-active guidance system. Generally, such semi-active guidance system includes a target tracking radar antenna gimballed within the missile and coupled to a control system (i.e., the antenna and control system therefore being referred to collectively as a missile seeker) for tracking the target and to thereby generate guidance signals for the missile.

In one type of missile system, the features of command guidance and semi-active guidance techniques are combined. During the early portion of the missile's flight, the missile is guided by a command guidance phase where the guidance command signals are developed by the digital computer operated in response to signals obtained by tracking both the missile and a selected target with a remote, high resolution, surface-based radar system. During the later portion of the flight, the missile is guided by a semi-active guidance phase where guidance signals are obtained by tracking the target with the missile-borne radar receiver fed by the gimballed antenna system which receives reflected power from target illuminations by the surface-based radar system. In one system, the antenna provides a stable reference for the command guidance phase, such system being described in U.S. Pat. No. 4,142,695 entitled "Vehicle Guidance System" issued Mar. 6, 1979 and assigned to the same assignee as the present invention.

As is also known in the art, the use of an initial command guidance system phase followed by an active, missile homing guidance system terminal phase has been suggested. In such suggested arrangement, after the initial command guidance system phase (i.e., at the commencement of the active terminal phase), the missile seeker would first go through a search phase to search for the target and then, once the target is acquired, the missile seeker would go into a target tracking mode to thereby guide the missile to the target. With small targets, the search phase may be relatively long thereby reducing the time to guide the missile to the target. Generally, however, the shorter the time the missile has to guide to the target, the less likelihood the missile will successfully intercept the target.

SUMMARY OF THE INVENTION

In accordance with the invention, a method is provided for guiding a missile to a target. The method includes the step of providing a surface-based radar system having an electronically beam steerable antenna system adapted for continuous mechanical rotation about an axis. During a pre-terminal, semi-active missile homing guidance phase, the beam produced by the antenna system is electronically rotated in a direction counter to the direction of the mechanical rotation of the antenna system to thereby increase radar system illumination time on the target. During a subsequent terminal, active homing missile guidance phase, the missile is guided to the target with the pre-terminal, semi-active missile homing guidance phase establishing an angular orientation for a missile-borne antenna system at the commencement of the terminal, active missile homing guidance system phase.

With such method, the missile seeker need not have search mode target acquisition at the commencement of the terminal, active guidance phase because the missile seeker's antenna should be directed towards the target at the handover from the pre-terminal, semi-active guidance phase to the terminal, active guidance phase. Thus, the omission of the search mode at the commencement of the terminal phase increases the guidance time for the missile during the terminal phase and thereby increases the likelihood of a successful target intercept.

Further, with such method, because, during the pre-terminal, semi-active missile homing guidance phase, the beam produced by the antenna system is electronically rotated in a direction counter to the direction of the mechanical rotation of the antenna system, the radar system illumination time on the target is increased thereby increasing the effective radar dwell time (i.e., number of radar updates) to the missile seeker and enabling the pre-terminal, semi-active phase to operate with longer transmitted pulses from the surface-based radar system transmitter. Therefore, the pre-terminal, semi-active phase is with a substantially continuous wave transmitted radar signal at the peak radar power enabling a notch filter to reduce clutter for the radar return signal used for processing in a missile-borne processor.

In accordance with another feature of the invention, the beam is electronically rotated in a direction counter to the direction of mechanical rotation, such counter rotation occurring a plurality of times during each mechanical rotation of the antenna system.

In accordance with another feature of the invention, the beamwidth of the beam produced by the antenna system is increased (i.e, spoiled) when such beam is electronically steered in a direction counter to the direction of mechanical rotation. In a preferred embodiment, the mechanical rotation is an azimuthal rotation.

In accordance with another feature of the invention, a missile guidance system is provided. The system includes a radar antenna system, gimballed within the missile and adapted to receive radar signals in a first frequency band and in a second, different frequency band. A missile-borne active radar system is provided having a radar transmitter and receiver coupled to the antenna system and adapted for operation at the first frequency band. A missile-borne semi-active radar system receiver is coupled to the antenna system and adapted for operation at the second frequency band. A missile-borne signal processor is adapted to produce target tracking signals from radar signals fed thereto through the antenna system from either the active radar system receiver or the semi-active radar system receiver. The target tracking signals are fed to the antenna system to gimbal the antenna system and thereby direct the antenna system towards the target. A switch is fed by radar signals produced by the active radar system receiver and radar signals produced by the semi-active radar system receiver. The switch feeds one of such radar signals to the signal processor selectively in response to a control signal. The control signal operates the switch to feed the semi-active radar system receiver to the signal processor during a pre-terminal, semi-active guidance phase to thereby direct the missile-borne antenna system towards the target during such pre-terminal phase and to subsequently feed the active radar system receiver to the signal processor at commencement of a terminal, active guidance system phase.

BRIEF DESCRIPTION OF THE DRAWING

These and other features of the invention, as well as the invention itself, will become more readily apparent when read together with the accompanying drawings, in which.

DESCRIPTION OF THE PREFERRED EMBODIMENTS

Figure 1:
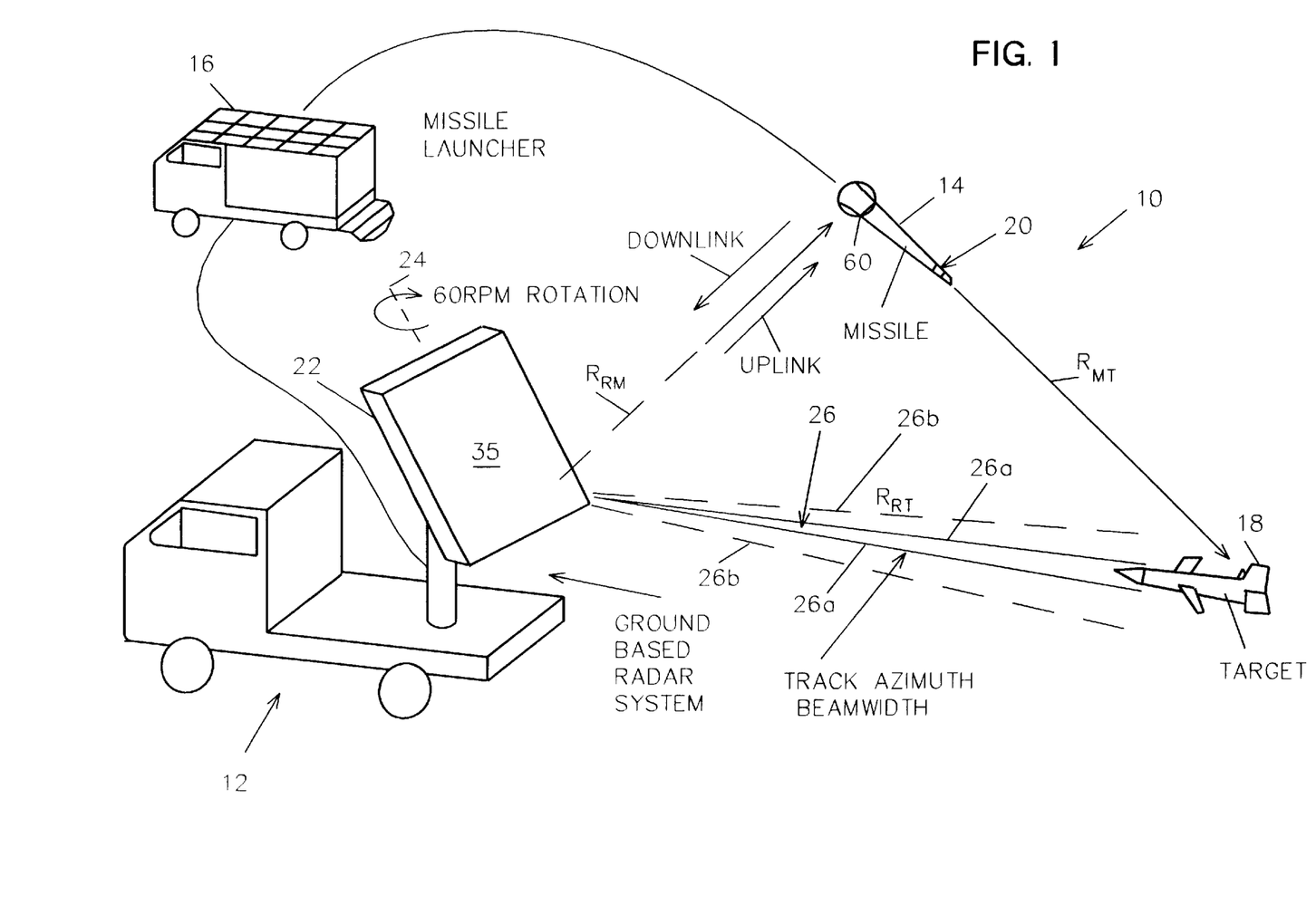
FIG. 1 is a sketch showing a missile being guided towards a selected target in accordance with the invention, such missile being guided during a portion of its flight towards the target in a pre-terminal, semi-active guidance phase using a surface-based radar system and a missile-borne seeker and during a terminal, active guidance phase using a missile-borne transmitter/receiver.

Referring now to FIG. 1, a radar guided missile system 10 is shown to include a surface-based, here ground-based, radar system 12 and a missile 14 adapted for being launched by missile launcher 16 to intercept a target 18. More particularly, the missile 14 is shown in flight being guided to intercept the target 18 in three guidance phases: an initial command guidance phase; a subsequent mid-course, or pre-terminal, semi-active guidance phase; and a subsequent, terminal active guidance phase. During the initial command guidance phase, the guidance signals are developed in the missile 14 from signals transmitted to the missile from the surface-based radar system 12 relating to the position and velocity of both the missile and the target in a common, missile based co-ordinate system. During the subsequent, pre-terminal, semi-active guidance mid-course phase, the guidance signals are developed in the missile 14 from a semi-active portion of a missile seeker 20 shown, and to be discussed in more detail, in connection with FIG. 2. Suffice it to say here, however, that the semi-active portion of the missile seeker 20 receives target reflections of the surface-based radar system 12 transmitter. During the final, i.e., terminal, active guidance terminal phase, the guidance signals are developed by an active portion of the missile seeker 20 shown, and to be described in more detail in connection with FIG. 2. Suffice it to say here, however that both the semi-active portion 20a (FIG. 2) and the active portion 20b of the missile seeker 20 receive radar returns from a common, gimballed, antenna system portion 20c of the missile seeker 20. Thus, the antenna system 20c is initialized for the terminal active guidance phase by such common antenna system 20c being used to track the target 18 (FIG. 1) during the preceding (i.e, pre-terminal), semi-active guidance phase.

More particularly, the radar transmitter of the surface-based radar system 12 (FIG. 1) is adapted to transmit radar signals in a first frequency band (i.e., the surface-based radar system 10 frequency). The surface-based radar system 12 has a search antenna system 22 adapted for continuous mechanical rotation 360 degrees about the azimuthal axis 24 at a predetermined rotational rate, here 60 revolutions per minute (RPM), to search for the target 18. The surface-based antenna system 22 is a adapted to produce an electronically steerable beam 26. Here, such surface-based antenna system 22 is a phased array antenna adapted to electronically form and direct the radar beam 26. The range from surface-based radar-to-target is $R_{RT}$, the range from the surface-based radar-to-missile is $R_{RM}$, and the range from missile-to-target is $R_{MT}$, as indicated in FIG. 1.

Figures 2, 2B:
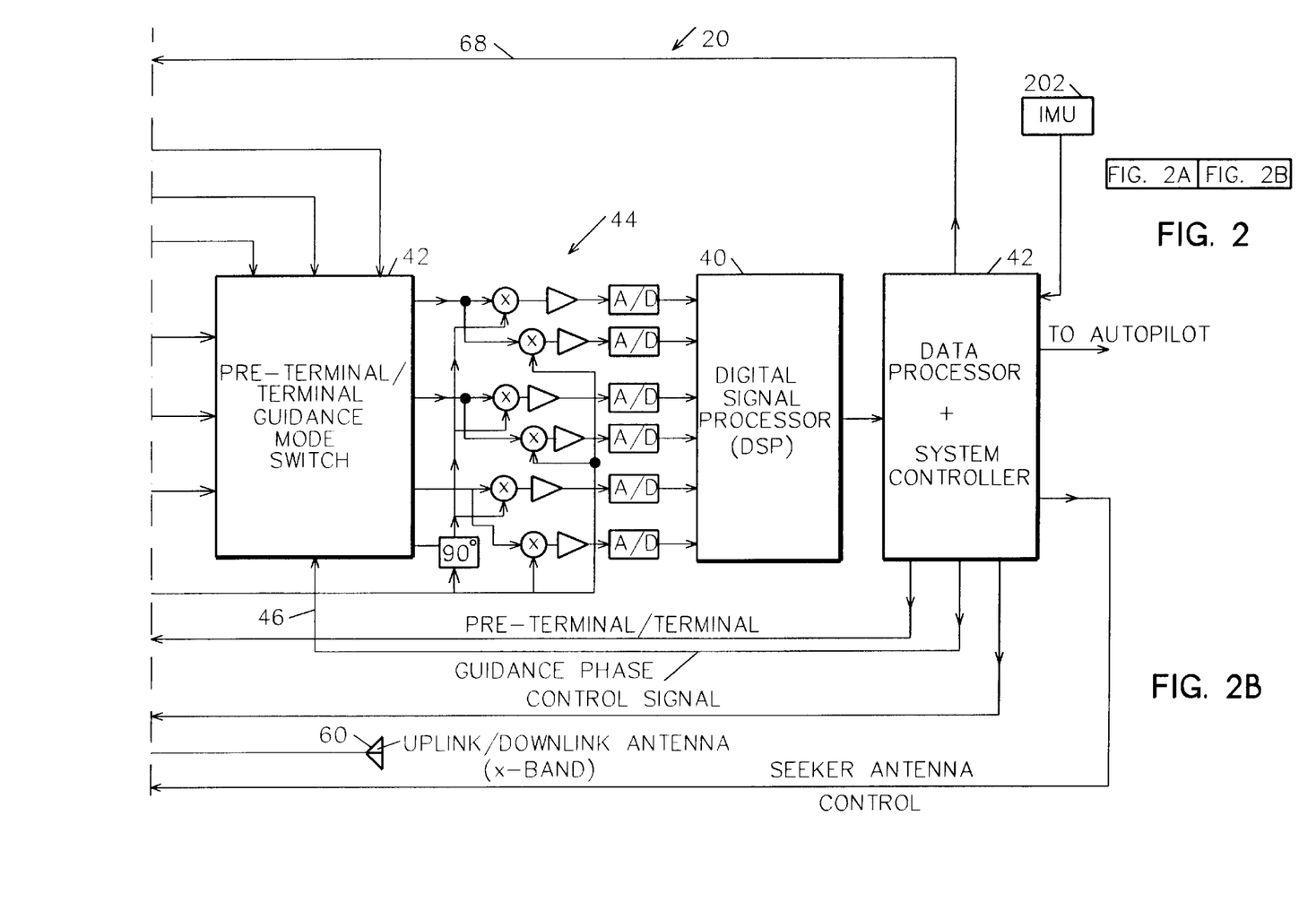
FIG. 2 is a block diagram of the missile seeker used in the missile of FIG. 1.
Figure 2A:
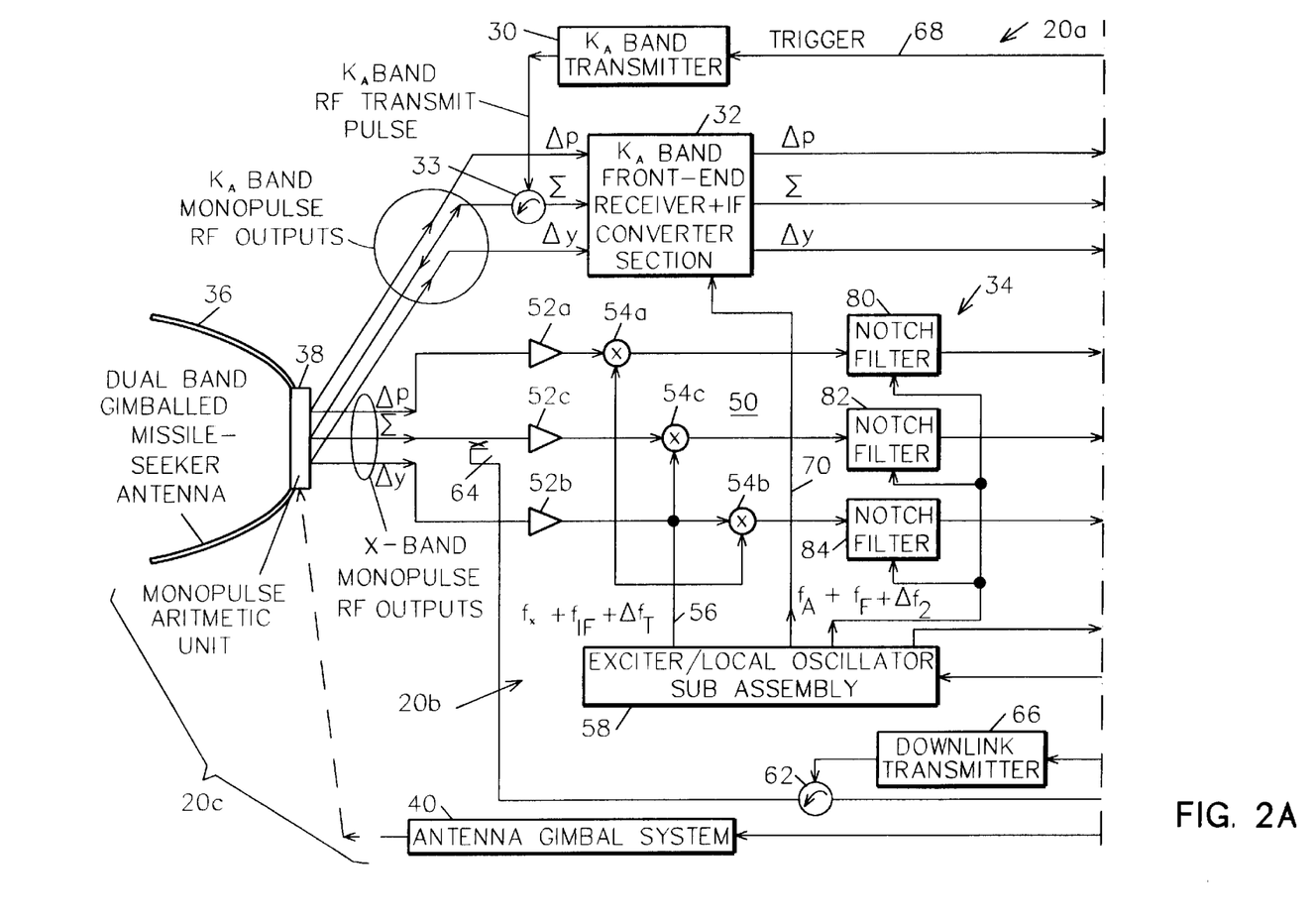

The missile 14 is a surface launchable missile having disposed therein the missile seeker 20, shown in detail in FIG. 2. Thus, the missile seeker includes in the active portion 20a thereof a radar transmitter 30 and receiver 32 adapted for operation in a second, higher frequency band (i.e., the missile's frequency); and in the semi-active portion 22b thereof a semi-active receiver 34 adapted for operation at the first frequency band. The missile seeker 20 also includes the common antenna system 20c. The antenna system 20c includes a dual-band monopulse antenna 36 and monopulse arithmetic unit 38 and an antenna gimbal system 40, arranged as indicated. The monopulse arithmetic unit produce a pitch difference channel signal, $\Delta_P$, a yaw difference channel signal, $\Delta Y$, and a sum channel signal, $\Sigma$, as indicated. The pitch difference channel signal, $\Delta_p$, a yaw difference channel signal, $\Delta Y$, and a sum channel signal, $\Sigma$, are fed to both the active portion 20a and semi-active portions of seeker 20, as indicated. The sum channel, $\Sigma$, is fed to the active transmitter 32 and the active receiver 30 through a circulator 33, as indicated.

The antenna 36 is gimballed within the missile 14 (FIG. 1) and is adapted to receive radar signals transmitted by the surface-based antenna system 12, after reflection by the target 18, in the first frequency band during a pre-terminal, semi-active guidance phase and to receive in receiver 32 radar signals transmitted by the missile on-board active radar transmitter 30, after reflection by the target 18, in the second frequency band during a subsequent terminal, active guidance phase. The missile seeker 20 (FIG. 2) has a digital signal processor (DSP) 40 adapted to produce target tracking signals from radar signals fed thereto from either the active radar system receiver during the terminal, active guidance phase or from the semi-active radar system receiver during the pre-terminal, semi-active guidance phase, such target tracking signals being fed to the missile radar antenna system though a data processor and system controller to the antenna gimbal system 40 to direct the missile radar antenna 36 towards the target 18. The missile seeker 20 (FIG. 2) has a switch 42 fed by radar signals produced by the active radar system receiver 32 and radar signals produced the semi-active radar system receiver 34. The switch 42 feeds one of such radar signals (i.e., either the $\Delta_p$, $\Delta_y$, and $\Sigma$ signals from active receiver 32 or semi-active receiver 32) to the digital signal processor 40 (via an intermediate frequency to video frequency signal down-conversion section 44) selectively in a control signal fed to the switch via line 46. The control signal on line 46 operates the switch 42 to feed the semi-active radar receiver 34 to the digital signal processor 40 during the semi-active guidance phase prior to feeding the active radar system receiver 32 to the digital signal processor 40 during the active guidance phase. The digital signal processor 40 and the data processor and system controller 42 produce the target tracking signals for the missile radar antenna system 20c to direct the antenna 36 towards the target 18 from the semi-active radar signals during the semi-active phase and thereby establish an initial radar missile antenna 36 angular orientation at commencement of the subsequent terminal, active guidance phase. The digital signal processor 40 and data processor and system controller 42 also provide control signal to the guidance section, not shown, (i.e., autopilot) to direct the missile 14 to the target 18.

The surface-based radar system 12 (FIG. 1) includes a controller, not shown, for controlling the width of the beam 26 (FIG. 1). More particularly, the beamwidth is relatively narrow, as indicated by the solid lines 26a, during target search and track modes and is relatively wide, as indicated by the dotted lines 26b, during a target illumination mode. For example, the search mode beamwidth may be 13 mils corresponding to a time-on-target of 2 milliseconds (i.e., a 500 HZ frequency resolution) and the target illumination beamwidth may be 39 mils corresponding to a time-on-target of 6 milliseconds (i.e., a 167 Hz frequency resolution within the missile). More particularly, the surface-based radar system 12 scans the horizon by continuously mechanically rotating the surface-based radar system antenna 22 three-hundred and sixty (360) degrees with such surface-based radar system 12 operating with a pulsed-doppler waveform to search for the target 18 during an acquisition mode. The mechanical rotation is with an electronically focused, relatively narrow beamwidth (as indicated by the solid lines 26a) during both interleaved transmit and receive modes of the acquisition mode. During this phase, upon detection of the target 18 (FIG. 1) by the surface-based radar system 12, the radar system 12 assesses the validality of the target 18. If valid, and hostile, a missile is launched.

Figure 3:
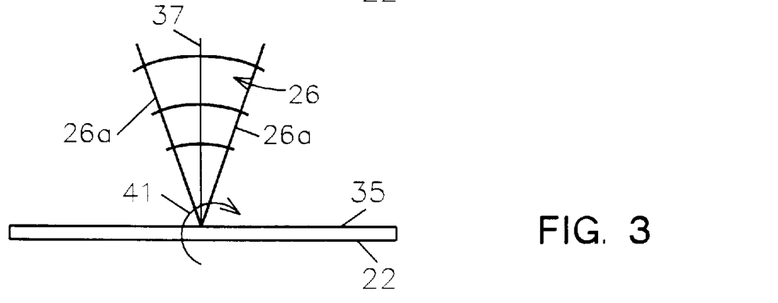
FIG. 3 is a sketch showing the relative position of the target of FIG. 1 and a mechanically rotating, electronically beam steerable antenna used by a surface-based radar system to track and then illuminate such target at the commencement of an illumination dwell on the target by the surface-based radar system.

After target track and missile launch, the beam has a nominal predetermined angular orientation with respect to an antenna system producing the beam during the mechanical rotation. During pre-terminal phase illumination, as indicated in FIG. 3, the nominal, predetermined angular orientation of the beam 26 is normal (i.e, perpendicular) to the face 35 (i.e., planar aperture of the antenna 22). It is noted, however, that during each mechanical rotation of the antenna system the beam 26 produced by the antenna system is electronically rotated in a direction counter to the mechanical rotation of the antenna system during a predetermined angular section, here 30 degrees of the line-of-sight to the target 18 to allow the beam 16 to increase illumination time of the target 18 by the beam 26 as the antenna 22 continues to mechanically rotate 360 degrees. Here, the electronic counter-rotation occurs three times during the 30 degrees of each mechanical rotation by the antenna system.

The missile 14 operates in the pre-terminal, semi-active guidance phase with the surface-based radar system 12 operating in the substantially continuous wave (CW) waveform as the beam electronically produced by the surface-based radar system 12 illuminates the target 18 over the predetermined, here 30 degree sector. During the pre-terminal semi-active phase, the missile seeker 20 (FIG. 2) tracks the target 18. Thus, the control signal on line 46 (FIG. 2) is provided to the switch to feed the semi-active radar receiver 34 to the digital signal processor 40 during a pre-terminal, semi-active guidance phase to thereby direct the missile-borne antenna 36 towards the target during such pre-terminal phase and the control signal on line 46 changes at the terminal guidance phase to subsequently feed the active radar system receiver 32 to the digital signal processor 40 at commencement of the terminal, active guidance system phase.

Referring again to FIG. 2, the missile seek 20 has in the semi-active receiver 34 section thereof an RF to IF down-conversion section 50. The down-conversion section includes amplifiers 52a, 52b, and 52c disposed in the pitch difference channel, $\Delta_p$, yaw difference channel, $\Delta Y$, and sum channel, $\Sigma$, respectively, as indicated. Mixers 54a, 54b, 54c are fed the pitch difference channel signal, $\Delta_p$, yaw difference channel signal, $\Delta Y$, and sum channel signal, $\Sigma$, respectively, as indicated. Also fed to the mixers 54a, 54b and 54c is a local oscillator, intermediate frequency signal on line 56 (i.e., $fA+f_{IF}$), where fA is the frequency of the surface-based radar system 12 transmitter and $f_{IF}$ is the intermediate frequency of the semi-active receiver 34, shifted in frequency by $\Delta F_2$, where $\Delta F_2$ is the doppler frequency shift of the target 18 at the radar frequency at the seeker 20. This local oscillator signal on line 56 is produced by an exciter/local oscillator sub-assembly 58 in response to, inter alia, a determination of the target doppler frequency, $F_2$, (i.e., $F_2=2R'_T/\lambda A$, where $R'_T$ is the time rate of change in the range to the target, $R_T$, and $\lambda_A$ is the wavelength of the transmitted radar energy.

Figure 3A:
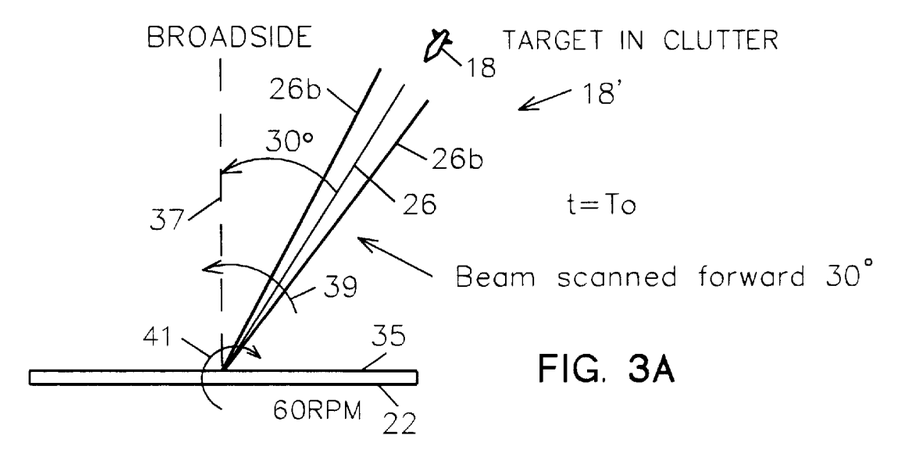
FIG. 3A is a sketch showing the relative position of the target of FIGS. 1 and 3 and the mechanically rotating, electronically beam steerable antenna of FIG. 3 used by a surface-based radar system to track and then illuminate such target at the commencement of the target illumination dwell.
Figure 3B:
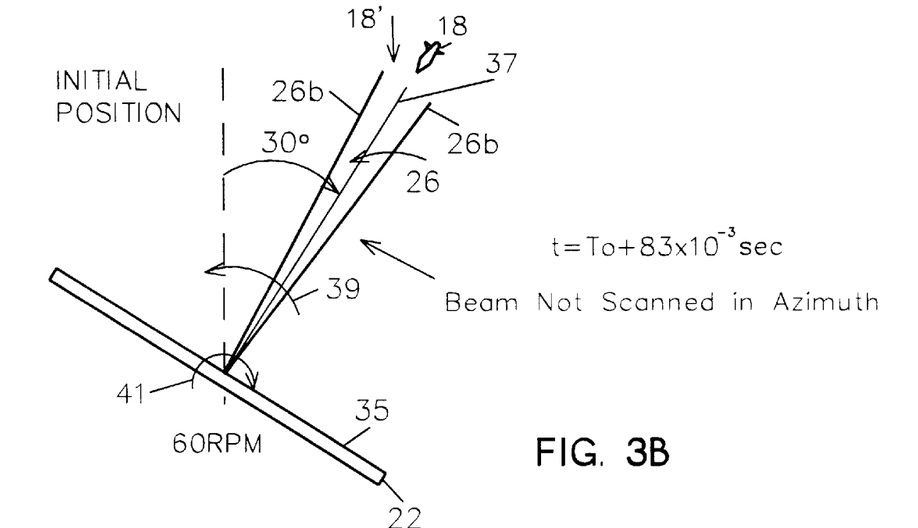
FIG. 3B is a sketch showing the relative position of the target of FIGS. 1 and 3 and the mechanically rotating, electronically beam steerable antenna of FIG. 3 used by a surface-based radar system to track and then illuminate such target at the termination of the illumination dwell.

The general operating sequence is as follows: The surface-based radar system 12 (FIG. 1) searches the horizon for targets using a medium pulse repetition frequency (PRF) pulse doppler waveform. The beam 26 is focused (i.e., narrow) on both transmit and receive and is directed along an angle normal to the radiating face 35 of the antenna 22. Once a target is detected and the missile is subsequently launched, and ready for illumination, at time $t=T_0$, by the surface-based radar system 12, the surface-based radar system 12 quickly electronically scans the beam 26 in a direction counter (i.e., direction 39 in FIGS. 3A and 3B) to the mechanical rotation 41 of the surface-based radar system 12 antenna 22 (i.e., backwards from the normal 37 (FIG. 3) to the antenna face 35), as shown in FIG. 3A to allow the beam 26 to electronically scan past the detected target 18 location 18' even though the antenna 22 is mechanically rotated away from such location 18'. Thus, the electronic counter-rotation scanning of beam 26 allows for subsequent illumination of the target. The time duration for three target illuminations occurs here over an 83 millisecond period. FIG. 4B shows the track and three target illuminations per 360 degree mechanical rotation of the antenna system. It is noted that while the beam 26 is electronically scanned forward of the normal 37 by 30 degrees to begin illumination of the target 18, as the antenna continues its mechanical rotation, the width of the beam 26 is both electronically widened to beamwidth 20b from beam width 20a (FIG. 1) (i.e., spoiled) and electronically scanned counter to the direction of the mechanical rotation of the antenna at a rate to maintain the beam on the target for here a 30 degree mechanical rotation of the antenna, as indicated in FIGS. 3, 3A and 3B. The spoiling of the beam increases the target dwell time to here 6 millisecond target illumination time, as indicated. It is noted that there are three 6 millisecond dwells per 83 milliseconds.

Considering action prior to missile launch, it should be noted that, if the target 18 is declared hostile, and engagable, the missile 12 is launched to intercept the target 18 (FIG. 1). The surface-based radar system 12 first acquires the missile 14 in flight for the command guidance phase with a cluster of multiple beams formed by sequential scan blocks. Once the missile 14 is acquired in it's flight to the target 18, an radar uplink message is transmitted from the surface-based radar 12 to the missile 14. The missile 14 receives the uplink message by its rear mounted uplink/down link antenna 60 (FIGS. 1 and 2). The message is fed from the antenna 60 via circulator 62, via directional coupler 64 through the sum channel, $\Sigma$, switch 42 heterodyning section 40, and digital signal processor 40 to data processor and system controller 42, as indicated. (It should be noted that the notch filter in the sum channel is by-passed by a switch, not shown.) The data processor and system controller 42 immediately responds with a downlink message via downlink transmitter 66, circulator 62 and antenna 60, within a fixed, small interval from the uplink message receipt. This allows the surface-based radar system 12 to establish a beacon track of the missile 14. The uplink/downlink message communication period is here, in this example, 1 milliseconds depicted in FIG. 4B at 102, 108, 114, 116 and 122.

The surface-based radar system's fire control task for stressing (i.e., a relatively small target) is to initiate the pre-terminal, semi-active guidance phase, in order to direct the missile seeker's antenna 22 (FIG. 2) aligned with the direction to the target 18 (FIG. 1) as close as possible. Once the missile 14 is close enough in range to the target 18 that its predicted missile terminal, active guidance phase will be successful (i.e. in accordance with predetermined criteria to be discussed), the missile 14 transitions from the pre-terminal, semi-active guidance phase to the terminal, active guidance phase and the control signal on line 46 switches switch 46 to de-couple the semi-active receiver 34 from the heterodyning section and couples the active receiver 32 to the heterodyning section. Thus, begins the terminal active guidance phase with the active transmitter 30, produces trigger pulses on line 68 from the data processor and system controller 43, as indicated. Further, the local oscillator signal for the active receiver is provided on line 70 by the exciter/local oscillator sub-assembly 58, here such signal on line 70 having a frequency $f_M+f_{IF}+f_d$ where $f_M$ is the frequency transmitted by the active transmitter 30, and $f_d$ is the target doppler frequency at the missile frequency.

Figure 4A:
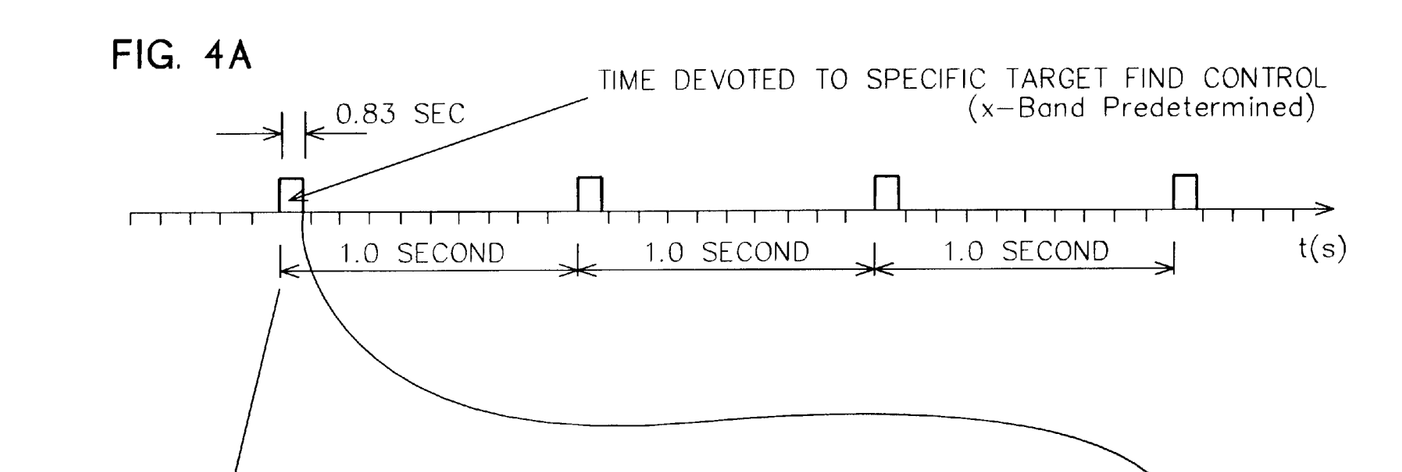
FIG. 4A is a timing diagram showing period time durations for track, uplink, and illumination devoted to a specific target during each mechanical rotation of the antenna system of FIGS. 3A and 3B.
Figure 4B:
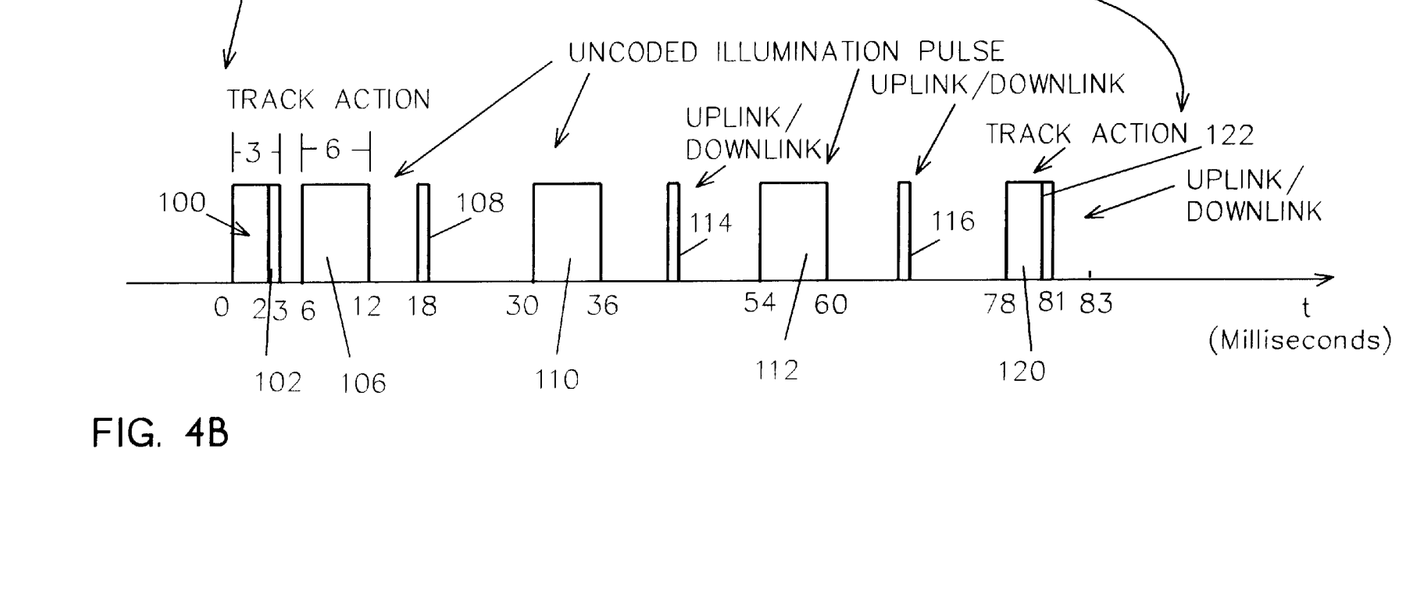
FIG. 4B is a timing diagram showing actions taken by the surface-based radar system during an exemplary one of the time period of FIG. 4A, the time scale of the timing diagram of FIG. 4B being expanded relative to the timing diagram of FIG. 4A.

More particularly, and referring to FIGS. 3, 3A, 3B and 4A, as noted above, the all pre-terminal, semi-active guidance occurs for a specific target occurs over a 30 degree scan sector of the surface-radar system 12. At, in this example, the 60 revolution per minute (RPM), this translates into 83 milliseconds out of a 1.0 second tracking update rate, as indicated in FIG. 4A. Referring also to FIG. 4B, here only 81 millisecond of the 81 milliseconds is utilized. Thus, as shown in FIG. 4B, for each one of 83 millisecond period, the following events occur: During the first 2 millisecond period 100, the surface-based radar system 12 operates in a pulsed-doppler tracking mode. This is followed by a one millisecond period 102 uplink/ downlink message mode between the surface-based radar system 12 and the missile 14. During this one millisecond uplink/downlink period 102 message mode, a message is sent from the surface-based radar system 12 to the missile 14 to update state vectors in the missile on-board processors 40, 42 and also sets a bit to allow the missile on-board processors 40,42 to configure the on-board semi-active receiver 34 and processors 40, 42 for the pre-terminal phase. The surface-based radar system 12 now starts target 18 illumination during time period 106 (FIG. 4B). During target 18 illumination, the surface-based radar system 12 increases (i.e., spoils) the transmitted radar beam 26 width by a factor, here 3:1 to allow for, here, a 6 millisecond radar dwell. As described above in connection with FIGS. 3, 3A and 3B, the transmitted radar beam 26 is electronically scanned backwards as the antenna 22 continuous to rotate in the opposite direction so that the beam 26 is positioned to scan past the target 18 as the radar antenna 22 continues such counter, mechanical rotation. The transmitted illumination is here, a 6 millisecond uncoded pulse (i.e, a substantially continuous wave (CW) waveform radar signal) during time period 106. More particularly, the 6 millisecond transmitted pulse is matched to the 6 millisecond dwell time that the surface-based radar transmitter beam scans the target as it continues its mechanical rotation. The transmitted pulse is at peak power. Spoiling the transmit beam 26 by a 3 to 1 factor reduces the antenna gain by 5 dB but does not reduce the illumination energy to the missile because the coherent dwell time has tripled. The advantage gained by doing this is that the frequency resolution in the missile is improved by 3:1 (i.e., reduced from 500 Hz to 167 Hz). It is noted that during target illumination by the surface-based radar system 12 transmitter during time period 106, the surface-based radar system receiver 12 is not utilized.

Following the target illumination burst during time period 106, the beam is again electronically scanned back (i.e., in a rotation counter to the mechanical rotation of the surface-based radar system antenna 12) to allow for an uplink/downlink message. This downlink message during the 1 millisecond time period 108 from the missile 14 to the surface-based radar system 12 indicates whether the missile seeker 20 (FIG. 2) has locked to the target 18.

Because the surface-based radar system 12 here being considered is limited to a 25% duty factor, another illumination pulse cannot start for another 24 milliseconds. Two other scanned back illumination pulses at time periods 110 and 112 with their companion uplink/downlink message time periods 114, 116, as indicated in FIG. 4B. A final pulse doppler target tracking mode during time period 120 with a focused, 2 millisecond dwell followed by an uplink/down link message during time period 122 to compete the 81 millisecond interval in each mechanical rotation of the surface-based radar system antenna 22. The use of multiple, here three, target illumination pulses (i.e., during time periods 106, 110, and 120 each of 6 milliseconds provides a cumulative probability of missile seeker target detection enhancement of at least 1 out of 3. For example, if the probability of the missile seeker detection is 0.7 for any one target illumination pulse, the cumulative probability of detection is 0.97.

Figure 5A:
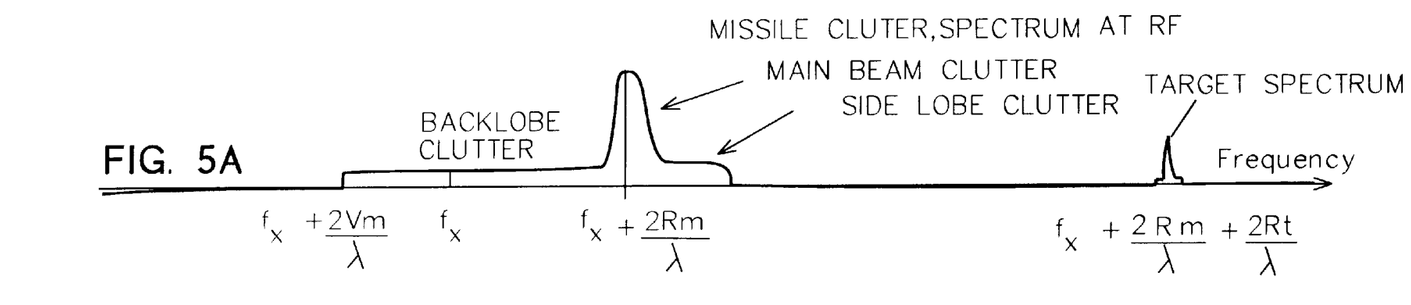
FIG. 5A is a diagram of the radio frequency (RF) spectra at an missile-borne semi-active receiver section of the missile seeker, such frequency spectrum showing the missile antenna mainlobe, sidelobe, and backlobe clutter together with the target return spectrum.
Figure 5B:
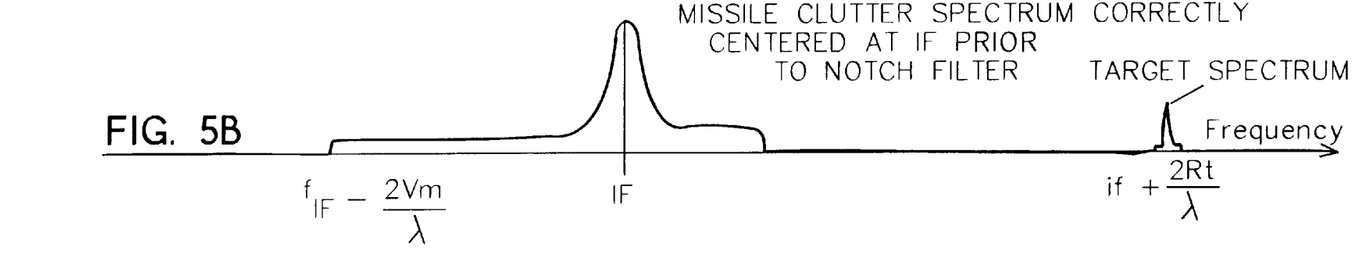
FIG. 5B is a diagram of the intermediate frequency (IF) spectra at an missile-borne semi-active receiver, such frequency spectrum showing the missile antenna mainlobe, sidelobe centered at the missile borne semi-active receiver's intermediate frequency and the target return spectrum offset in frequency from the intermediate frequency by the targets doppler velocity frequency component.

As noted above, because the target illumination pulse duration during the pre-terminal semi-active phase is relatively long and therefore a substantially CW waveform, the frequency spectrum of clutter and target at the missile seeker is as shown in FIGS. 5A–5B. It is noted that the spectra, being from a substantially CW waveform transmitted signal, does not repeat at pulse repetition frequency lines as with a pulsed illumination waveform over the target illumination dwell. Thus, with the substantially CW waveform illumination signal, the target spectral main lobe width is approximately 167 Hz. The main lobe clutter width is determined by convolution in frequency of the clutter illuminated by the surface-based radar transmitter beam with the spectrum of a 6 millisecond uncoded (i.e., substantially CW waveform) pulse. FIG. 5B shows the same spectra with the main beam clutter centered at the missile seeker's intermediate frequency (IF). It is desired that the main beam clutter spectra be centered at the missile seeker's IF so that the main beam clutter can be attenuated by the notch filter centered at the missile seeker's IF. Reducing main beam clutter with the notch filter reduces dynamic range requirements in subsequent IF, video and critical analog to digital converters.

It is also noted that because during the pre-terminal phase the missile-borne received waveform is substantially CW over a here, 6 millisecond batch processing time, each of the matched filter used in the semi-active missile-borne receiver 34 is a filter bank or Fast Fourier Transform (FFT). Further, utilizing and preserving peak surface-based radar transmitter power maximizes the energy to noise density ratio of the target in the missile-borne processor. This is in contrast to pulsed systems where the power processed is reduced by the duty factor of the pulses squared. A pulsed system's energy content is proportional to average power which is peak power times duty factor. With pulsed waveforms, the processor utilizes central line filters to attenuate main beam clutter repeated about every PRF line. Central line filtering reduces processing power by a multiplication of duty factor.

Figure 5C:
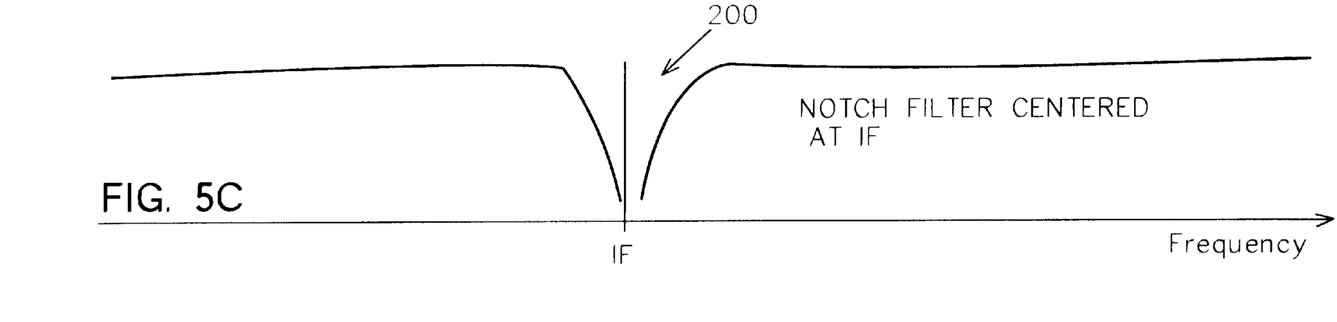
FIG. 5C is a diagram of the frequency spectrum of a notch filter used in the missile-borne semi-active receiver centered at the receiver's intermediate frequency to reduce the clutter spectrum shown in FIG. 5B.

Referring again to FIG. 2, it is noted that the semi-active receiver portion 20b of the missile seeker 20 includes notch filters 50, 52, and 54 disposed in the pitch difference channel, $\Delta_p$, yaw difference channel, $\Delta Y$, and sum channel, a, respectively, as indicated. The frequency spectrum of the filters 50, 52 and 54 is the same, the frequency spectrum of an exemplary one of such filters being shown in FIG. 5C. The positioning of the main beam clutter within the notch 200 of each of the notch filters 50, 52 and 54 at the missile seeker's IF requires a prediction of the location of the main beam clutter frequency above the surface-based radar system 10 frequency of a stable local oscillator on-board the missile which provides a reference to the surface-based radar transmitter frequency. Here, the stable local oscillator is in the exciter/local oscillator sub-assembly 58 (FIG. 2). Missile seeker's antenna portion position relative to the missile velocity vector is known by the missile-borne processor using missile-borne inertial measurement unit (IMU) 202 which produces data with the missile seeker's antenna 36 gimbal angles in data processor and system controller 42. The missile-borne exciter/local oscillator sub-assembly 58 includes a voltage controlled oscillator (VCO) which is commanded to offset the radar band local oscillator (fA+IF) by some incremental frequency ($\Delta F$) which is equal to the offset of the main beam clutter frequency relative to the surface-based radar transmitter illumination frequency. A fine adjustment in offset frequency is made with post Fast Fourier Transform FFT processing in the missile-borne processors 40, 42 where individual FFT filters contain reports of residual clutter. Standard centrioding algorithms provide the additional correction, if necessary.

At the end portion of the pre-terminal, semi-active phase, it should be understood that the missile seeker's antenna 36 should be directed towards the target 18. The control signal on line 46 briefly switches the active receiver 32 to the signal processor 40 to determine whether the active radar system is receiving target returns of sufficient strength to proceed to the terminal, active guidance phase. When the active radar system detects sufficient target return signals, the terminal, active guidance mode is commenced and the switch 42 maintains the active receiver 32 coupled to the digital signal processor 40. It should be noted that because the semi-active receiver 34 and the active radar receiver 32 use a common, missile-borne antenna (i.e., the antenna 36 of the missile seeker used during both the pre-terminal and terminal phases of the missile's flight), the missile-borne antenna 36 should be directed towards the target 18 at the commencement of the terminal, active guidance phase thereby eliminating the requirement for an active missile seeker radar target acquisition mode.

As noted above, the surface-based radar system 12 operates in a substantially continuous wave (CW) mode when illuminating the target 18 during the missile's pre-terminal semi-active guidance phase. Further, missile 14 carries the notch filter 50, 52, and 54 coupled between the missile-borne radar antenna system 36 and the switch 42. The notch filters 50, 52 and 54 are tuned to clutter radar return signals as described above during the pre-terminal, semi-active guidance phase.

As noted above, the missile 16 has disposed therein an up-link receiving antenna 60 adapted for communication with the surface-based radar system 12. The surface-based radar system 12 transmits an active phase initiation signal to the up-link antenna 60 and the control signal on line 46 for the switch 42 is produced in response to the active phase initiation signal. Here, the data processor and system controller 42 produces the terminal phase initiation signal in accordance with a calculation of target cross-section or in accordance with a calculation of a predetermined probability of the active missile seeker radar system locking onto the target.

In view of the foregoing, it should be noted that the system described above provides for a semi-active illumination capability with a mechanically rotating surface-based radar system antenna. Further, the semi-active illumination capability optimizes the energy placed on the target 18. Specifically, the missile 14 processes a received signal proportional to the peak power of the surface-based radar system 12 and will not be diluted by duty factor or duty factor squared (in the case of a missile having a filter at the central frequency line associated with the duty factor) which is characteristic of a pulsed transmitted waveform and a missile without range gates. Multiple illumination dwells over a predetermined, e.g., 30 degree sector, further improves cumulative detection probability. Here, three are depicted in FIG. 4B.

Still further, the system described above has a semi-active illumination capability that utilizes transmit beam spoiling (i.e., beamwidth widening) for a correspondingly longer dwell on the target with no energy loss to the missile. This provides the missile-borne processor frequency resolution to allow main beam clutter notch filtering as described above and therefore improved target doppler frequency resolution for improved low missile-target closing velocity performance.

Further, the system provides a missile-borne signal processing architecture for the semi-active phase which does not require range gating, central line filtering, mentioned above, and significantly attenuates main beam clutter via simple notch filters 50, 52 and 54, as described above while preserving full received target energy for signal processing.

Still further, the system described above adds minimum additional cost to an active missile seeker portion 20b that typically requires a home-on-jam mode at the surface radar frequency in the event the target is a self-screening jammer.

Other embodiments are within the spirit and scope of the appended claims.

What is claimed is:

1. A method of operating a radar system, comprising the steps of:

providing a surface-based radar system having an electronically beam steerable antenna system adapted for continuous mechanical rotation about an axis; and electronically rotating a beam produced by the antenna system in a direction counter to the direction of the mechanical rotation of the antenna system; and increasing the beamwidth of the beam produced by the radar system when such beam is electronically rotated in the direction counter to the direction of the mechanical rotation of the antenna system.

2. The method recited in claim 1 wherein the beam is electronically rotated in the direction counter to the direction of the mechanical rotation of the antenna system a plurality of times during each mechanical rotation of the antenna system.

3. A method of operating a radar system, comprising the steps of:

providing a surface-based radar system having an electronically beam steerable antenna system adapted to continuously scan a horizon rotationally in azimuth by mechanically rotating the antenna system about an azimuthal axis, such antenna system electronically producing a beam having a nominal, predetermined angular orientation with respect to the mechanically rotating antenna system; and electronically deviating the beam from the nominal angular orientation by rotating the beam with respect to the antenna system in a direction counter to the direction of the mechanical rotation of the antenna system to thereby direct the beam towards a target for illumination by the radar system during a sector of each rotating scan by the antenna system and then returning the beam to the nominal, predetermined angular orientation after the antenna system has rotated through such sector; and increasing the beamwidth of the beam produced by the radar system when such beam is electronically rotated in the direction counter to the direction of the mechanical rotation of the antenna system.

4. The method recited in claim 3, wherein the beam is electronically rotated in the direction counter to the direction of the mechanical rotation of the antenna system a plurality of times during each mechanical rotation of the antenna system.

5. A method of guiding a missile to a target, comprising the steps of:

providing a surface-based radar system having an electronically beam steerable antenna system adapted for continuous mechanical rotation about an axis;

during a pre-terminal, semi-active missile homing guidance phase, electronically rotating a beam produced by the antenna system in a direction counter to the direction of the mechanical rotation of the antenna system;

during a subsequent terminal, active homing missile guidance phase, guiding the missile to the target; and wherein the pre-terminal, semi-active missile homing guidance phase establishes an angular orientation for a missile-borne antenna system at the commencement of the terminal, active missile homing guidance system phase.

6. The method recited in claim 5 including the step of increasing the beamwidth of the beam produced by the radar system when such beam is electronically rotated in the direction counter to the direction of the mechanical rotation of the antenna system.

7. The method recited in claim 6 wherein the beam is electronically rotated in the direction counter to the direction of the mechanical rotation of the antenna system a plurality of times during one mechanical rotation of the antenna system.

8. The method recited in claim 7 including the step of increasing the beamwidth of the beam produced by the radar system when such beam is electronically rotated in the direction counter to the direction of the mechanical rotation of the antenna system.

9. A method of guiding a missile to a target, comprising the steps of:

providing a surface-based radar system having an electronically beam steerable antenna system adapted to continuously scan a horizon rotationally in azimuth by mechanically rotating the antenna system about an azimuthal axis, such antenna system electronically producing a beam having a nominal, predetermined angular orientation with respect to the mechanically rotating antenna system;

during a pre-terminal, semi-active missile homing guidance phase, tracking a target with a missile-borne antenna system using target return signals received by the missile-borne antenna in response to such target being illuminated with radar energy transmitted by the surface-based radar system, such electronically beam steerable antenna system electronically deviating the beam from the nominal angular orientation by rotating the beam with respect to the antenna system in a direction counter to the direction of the mechanical rotation of the antenna system to thereby direct the beam towards the target for illumination by the radar system during a sector of each rotating scan by the antenna system and then returning the beam to the nominal, predetermined angular orientation after the antenna system has rotated through such sector;

during a subsequent terminal, active missile homing guidance phase, guiding the missile to the target using target return signals received by the missile-borne antenna in response to such target being illuminated with radar energy transmitted by a missile-borne transmitter; and wherein the pre-terminal, semi-active missile homing guidance phase establishes an angular orientation for the missile-borne antenna system at the commencement of the terminal, active missile homing guidance system phase.

10. A missile guidance system, comprising:

a radar antenna system, gimballed within the missile and adapted to receive radar signals in a first frequency band and in a second, different frequency band;

an missile-borne active radar system comprising: a radar transmitter and receiver coupled to the antenna system and adapted for operation at the first frequency band;

a missile-borne semi-active radar system receiver coupled to the antenna system and adapted for operation at the second frequency band;

a missile-borne signal processor adapted to produce target tracking signals from radar signals fed thereto through the antenna system from either the active radar system receiver or the semi-active radar system receiver, such target tracking signals being fed to the antenna system to gimbal the antenna system and thereby direct the antenna system towards the target;

a switch fed by radar signals produced by the active radar system receiver and radar signals produced the semi-active radar system receiver, such switch feeding one of such radar signals to the signal processor selectively in a control signal; and wherein the control signal operates the switch to feed the semi-active radar system receiver to the signal processor during a pre-terminal, semi-active guidance phase to thereby direct the missile-borne antenna system towards the target during such pre-terminal phase and to subsequently feed the active radar system receiver to the signal processor at commencement of a terminal, active guidance system phase.

11. A missile guidance system, comprising:

(a) a radar transmitter disposed at a surface-based and adapted to transmit radar signals in a first frequency band, such radar transmitter having a search antenna adapted for mechanical rotation about an axis at a predetermined rotational rate to search for a target;

(b) a missile having disposed therein:
 (i) an active radar system comprising: a radar transmitter and receiver adapted for operation at a second, different frequency band;
 (ii) a semi-active radar system receiver adapted for operation at the first frequency band;
 (iii) a missile radar antenna system, gimballed within the missile and adapted to receive radar signals transmitted by the surface-based antenna, after reflection by the target, in the first frequency band during a pre-terminal, semi-active guidance phase and to receive radar signals transmitted by the active radar transmitter, after reflection by the target, in the second frequency band during a subsequent terminal, active guidance phase;

(iv) a signal processor adapted to produce target tracking signals from radar signals fed thereto from either the active radar system receiver during the terminal, active guidance phase or from the semi-active radar system receiver during the pre-terminal, semi-active guidance phase, such target tracking signals being fed to the missile radar antenna system to gimbal the antenna system and direct the missile radar antenna system towards the target; and
 (iv) a switch fed by radar signals produced by the active radar system receiver and radar signals produced the semi-active radar system receiver, such switch feeding one of such radar signals to the signal processor selectively in a control signal; and (c) wherein the control signal operates the switch to feed the semi-active radar system to the signal processor during the semi-active guidance phase prior to feeding the active radar system receiver to the signal processor during the active guidance phase, such signal processor producing the target tracking signals for the missile radar antenna system to direct the antenna system towards the target from the semi-active radar signals during the semi-active phase and thereby establish an initial radar missile antenna system orientation at commencement of the subsequent terminal, active guidance phase.

12. The missile guidance system recited in claim 11 wherein the surface-based radar system includes a controller for controlling a beamwidth of the search antenna system, such beamwidth being relatively narrow during an initial target search mode and being relatively wide during a subsequent target tracking mode.

13. The missile guidance system recited in claim 12 wherein the pre-terminal, semi-active guidance phase occurs during the surface-based radar system target tracking mode.

14. The missile guidance system recited in claim 13 wherein the surface-based radar system operates in a substantially continuous-wave mode during the semi-active guidance phase and wherein the missile has disposed therein a notch filter disposed between the missile radar antenna system and the switch, such notch filter being tuned to clutter radar return signals during the pre-terminal, semi-active guidance phase.

15. The missile system recited in claim 14 wherein the missile has disposed therein an up-link receiver adapted for communication with the surface-based radar system and wherein the surface-based radar system transmits an active phase initiation signal to the up-link receiver and wherein the control signal for the switch is produced in response to the active phase initiation signal.

16. The missile system recited in claim 15 wherein the surface-based radar system produces the terminal phase initiation signal in accordance with a calculation of target cross-section.

17. The missile system recited in claim 16 wherein the surface-based radar system produces the terminal phase initiation signal in accordance with a calculation of a predetermined probability of the active radar system locking onto the target.

\* \* \* \* \*